Dec. 20, 1955  A. F. BRIEDE  2,727,534
SPRING ACTUATED ASSEMBLIES FOR LOADING TRANSPORT
TRUCKS WITH LIQUIDS FROM STORAGE RESERVOIRS
Filed Aug. 25, 1951  3 Sheets-Sheet 3
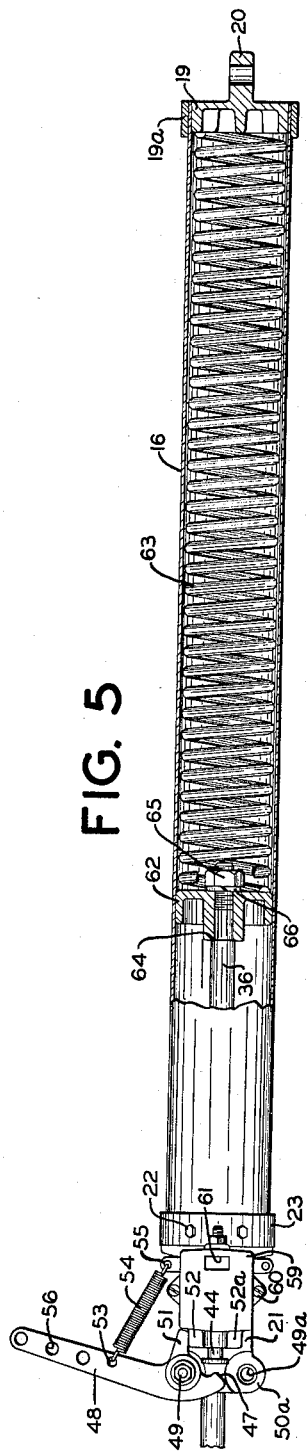
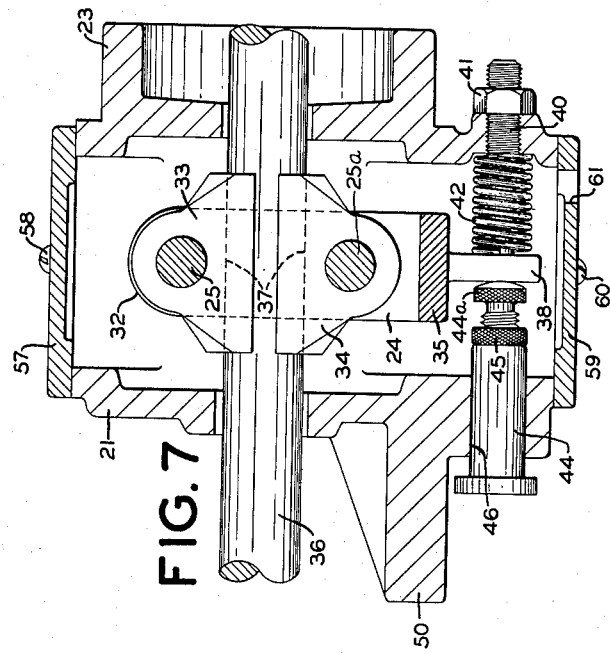
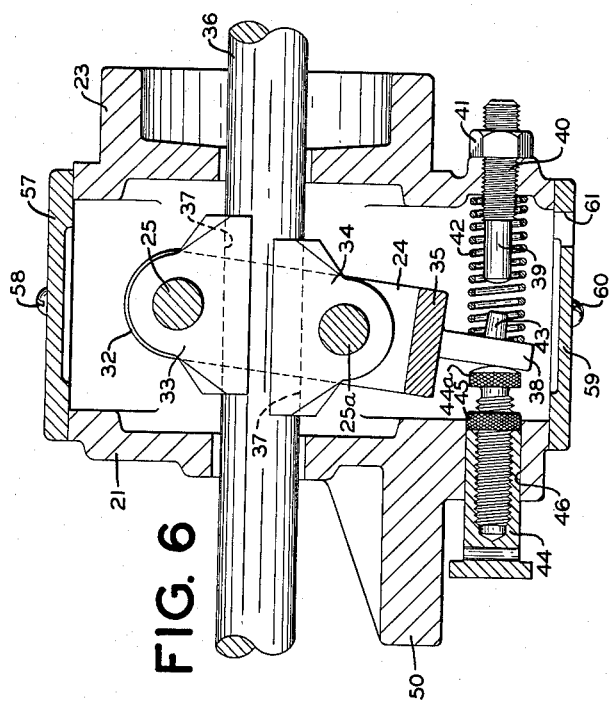
INVENTOR.
ARTHUR F. BRIEDE
BY
DES JARDINS, ROBINSON & KEISER
HIS ATTORNEYS

United States Patent Office 2,727,534
Patented Dec. 20, 1955

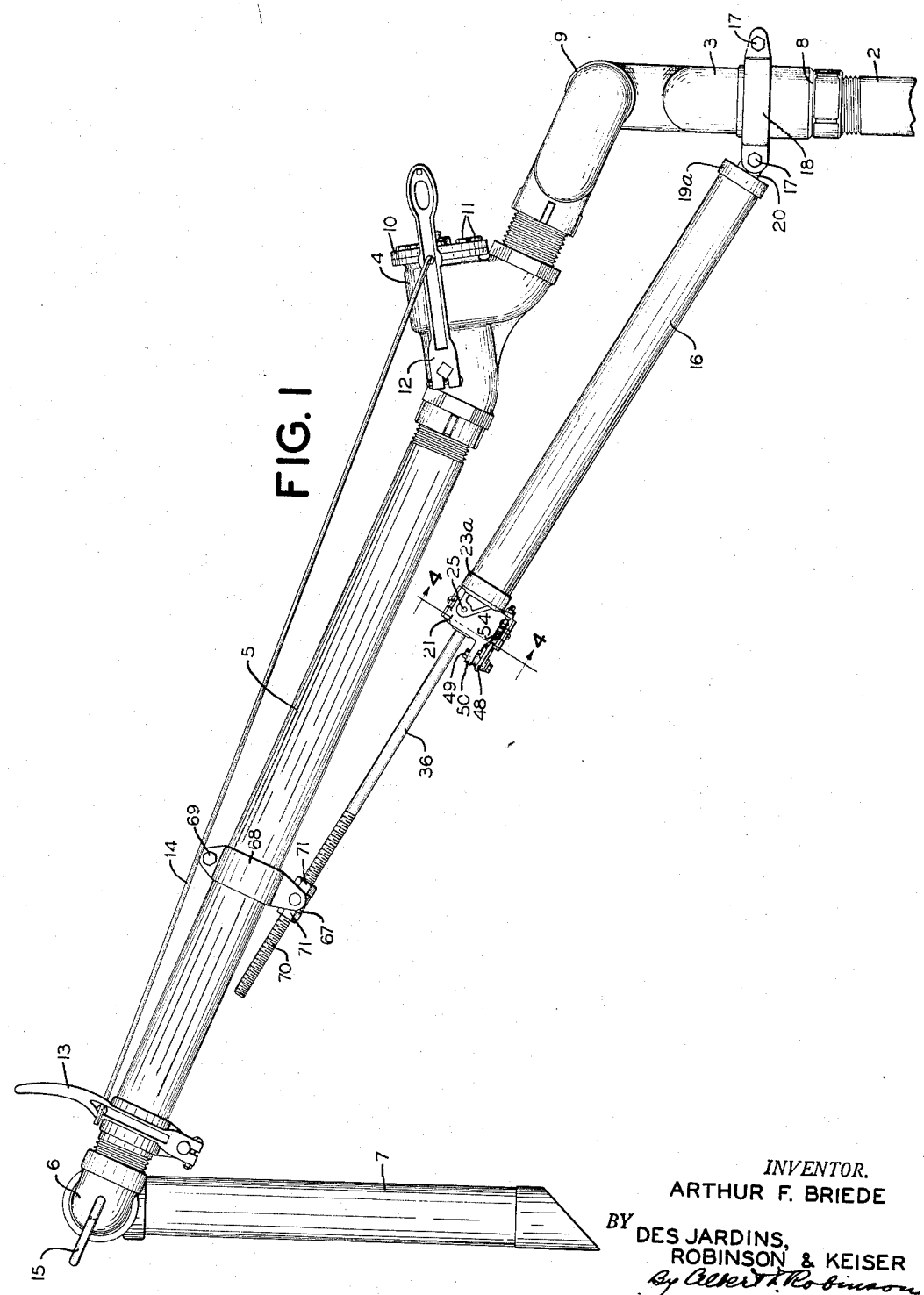

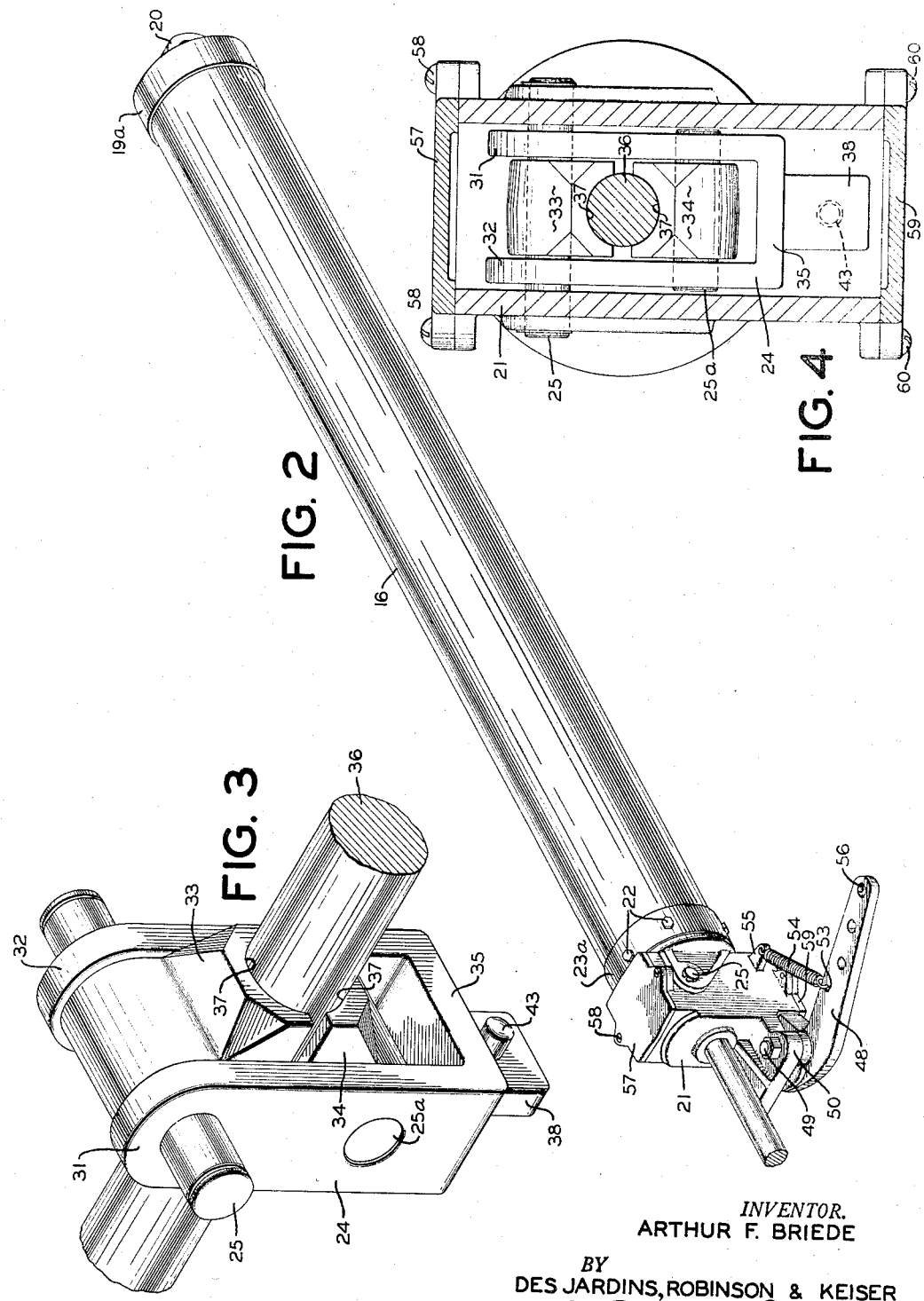

2,727,534

SPRING ACTUATED ASSEMBLIES FOR LOADING TRANSPORT TRUCKS WITH LIQUIDS FROM STORAGE RESERVOIRS

Arthur F. Briede, Cincinnati, Ohio, assignor to O P W Corporation, Cincinnati, Ohio, a corporation of Ohio Application August 25, 1951, Serial No. 243,684

17 Claims. (Cl. 137—615)

This invention relates to spring actuated assemblies for loading transport trucks with liquids from storage reservoirs, and it more particularly pertains to automatic means for holding the vertically swingable loading arm of the assembly unit in any vertical position in which it is swung until manually released.

Spring balanced loading assemblies are mounted on a pipe line leading from a storage reservoir, and are provided with a double swivel connection for permitting the free discharge end of the loading arm to be swung in a horizontal plane for vertical alignment with the filling opening of the transportation tank, and then pivoted in a vertical plane to said filling opening for filling the tank, after which it is swung up and out of the way. Means is provided for normally yieldably holding the free end of the loading arm of the assembly unit in its extreme elevated position, out of the way of the tank truck or car to be moved therebeneath. From this normally elevated position, the loading arm is swung into vertical alignment for filling the transportation tank and then swung back out of position after said transportation tank is filled. Heretofore, the loading arm has had to be manually held down from its normally yieldably held elevated position until the transportation tank was filled and to which elevated position it would tend to return immediately upon being released.

Accordingly, one of the objects of the present invention is to provide a locking means for automatically holding the loading arm of the assembly unit in any adjusted vertical position.

Another object of the invention is to provide manual means for releasing the automatic locking means.

Another object of the invention is provision of a locking means that does not interfere with the normal operation of the loading arm except holding it in any lowered position until released for return upward movement.

Still another object of the invention is the provision of a holding means that permits vertical lowering of the loading arm at all times from its normally yieldable held position but prevents its return until released.

Still another object of the invention is a simple and efficient holding means associated with the connecting rod of the spring return.

Further objects, and objects relating to details of construction and economies of operation, will readily appear from the detailed description to follow. In one instance, I have accomplished the objects of my invention by the device and means set forth in the following specification. My invention is clearly defined and pointed out in the appended claims. A structure constituting the preferred embodiment of my invention is illustrated in the accompanying drawings, forming a part of this specification, in which:

Fig. 1 is a perspective view of a conventional spring actuated loading assembly unit equipped with an automatic holding means embodying my invention.

Fig. 2 is a perspective view of the spring cylinder and the automatic holding means for the spring return of the assembly unit.

Fig. 3 is a perspective view of the mounting for a pair of jaws in the holding means.

Fig. 4 is a vertical cross sectional view taken on the line 4—4 of Fig. 1.

Fig. 5 is a bottom plan view of the spring cylinder and the automatic holding means with part of the spring cylinder broken away to show the spring.

Fig. 6 is a cross sectional view of a portion of the holding means showing it in holding position.

Fig. 7 is a cross sectional view similar to Fig. 6 showing the holding means in non-holding position.

Generally described, the invention comprises a spring balanced loading assembly unit for discharging liquids, such as gasoline, from a storage reservoir into transport tanks, such as railway tank cars or motor vehicle tank trucks. The loading assembly unit comprises a loading tube arm having one end pivotally mounted with a double swivel to permit it being swung in vertical and horizontal planes. The free end of the loading tube arm may have a drop tube movably attached thereto, and also have a handle fixed thereto that is connected by a rod to a valve mounted near the pivoted end of said loading tube arm. A spring actuating means is connected to the swivel end of the loading arm and to another portion thereof on the free end, said actuating means comprising a spring cylinder in which is housed a coiled compression spring between one end of the cylinder and a plunger, also housed within the cylinder, fixed to the end of a rod that projects through the end of the cylinder opposite to that end which seats one end of the spring. The end of the cylinder that is attached to the swivel end of the loading arm is pivoted to permit its opposite end being raised and lowered in a vertical plane with the free end of said loading arm, said opposite end being adjustably connected to the loading arm by means of the rod projecting from the cylinder. By the adjustably connected end of the rod to the loading arm, the degree of compression of the spring in the cylinder is regulated for resiliently returning said loading arm to its normally retracted elevated position.

A holding means, comprising a pair of clamping jaws, is mounted in a housing fixed to the end of the cylinder with the connecting rod passing therebetween, the adjacent faces of the jaws being grooved in conformity with the configuration of the connecting rod and slightly spaced therefrom. Both of the clamp jaws are pivoted to a carrier yoke which is pivoted to the housing by a pintle common to one of the clamp jaws. The other clamp jaw is pivoted to the yoke in spaced relation to the other clamp jaw that is pivoted to the yoke and housing by the common pintle. Accordingly, the lower clamp jaw being pivoted only to the yoke can be moved longitudinally relatively to the housing by reason of the yoke being pivoted to the housing, whereas the upper clamp jaw cannot do so. The bottom free end of the yoke, or a portion thereof, is positioned between an adjustable stop fixed to one side of the housing in spaced relation to a release slidably mounted in the opposite side of the housing. A compression spring is associated with the adjustable stop in position to normally urge the free end of the yoke away from the stop to holding position. The stop, having the spring associated therewith, is adjusted so that the free end of the yoke cannot be moved past the perpendicular position at any time when moving toward the limit stop. Accordingly, the clamp jaws are always in non-holding position in respect to the connecting rod of the return spring during its downward movement to compress the spring because the yoke carrier is forced toward perpendicular position, but they are immediately moved by the carrier spring to holding or non-perpendicular position to hold said rod upon its reverse movement. Perpendicular position of the yoke carrier means that its free bottom end is swung on the pivot between it and the housing for it to be perpendicular to the longitudinal axis of the connecting rod. With the yoke carrier in perpendicular position, there is free sliding movement between the connecting rod and the clamp jaws. Upon termination of the downward movement of the loading arm, the compressed main spring in the cylinder pushes the connecting rod of the spring return device back out of the cylinder to raise the loading arm to its normally elevated position. As soon as this rod starts to move backwardly, the yoke carrier is immediately swung to a non-perpendicular position by the yoke carrier spring, thereby causing the rod, moving in the same direction as the carrier yoke, to be clamped between the clamp jaws by the lower clamp jaw moving toward the longitudinal axis of the rod. This movement of the yoke, of course, increases the friction between the rod and the clamp jaws to hold the rod, thereby holding the loading arm at whatever elevation it is in at that time. Any tendency of the rod toward further movement out of the cylinder will increase the clamping action, thereby retaining it clamped until released. Manually operated means mounted on the housing is provided for swinging the yoke carrier to perpendicular position and against the carrier spring, and this is obtained by a release means disposed opposite the stop means and movably mounted on the housing with means for moving it, also mounted on the housing.

Referring specifically to the drawings in which like numerals are used to designate like parts, numeral 2 is a tube or pipe from a storage reservoir to which a loading arm, comprising a plurality of tubes, fittings or pipe sections 3, 4, 5 and 6 are connected in end-to-end relation. A drop tube 7 is connected to the end section 6 of the loading arm. There is one swivel connection 8 to permit swinging of the loading arm in a horizontal plane and another swivel connection 9 to permit swinging of said arm in a vertical plane. The section 4 is any conventional loading valve provided with an opening that is closed by a cap 10 bolted at 11 thereto. This valve is operated by a handle 12 or a remote control handle 13 that is fixed to the section 5 and connected by rod 14. A handle 15 is also fixed to the free end of the loading arm to be grasped by the operator for conveniently lowering said loading arm.

A spring actuated assembly is associated with the loading arm, said assembly comprising a spring cylinder 16 pivoted to one of a pair of bolts 17 which secures clamp sections 18 to the loading arm. This pivot bolt permits the cylinder to be swung upwardly and downwardly with the loading arm, and the cylinder can be swung in a horizontal plane with the loading arm since the clamp is fixed to the swivel 8 to move therewith. The pivoted end of the cylinder has a closure 19 fitted therein carrying a lug 20 recessed to receive the bolt 17. A reinforcing band 19a is applied to the end of the tube surrounding the closure.

A housing 21 is fixed to the opposite end of the cylinder by screw bolts 22 engaging the periphery of a cap 23 integral with the housing 21. Another reinforcing band 23a surrounds this end of of the cylinder. A yoke 24 contained within the housing is pivoted thereto by a pivot pin 25 passing through the opposite side walls of the housing and the ends of the two arms 31 and 32 of the yoke. The yoke is a carrier for a pair of clamp jaws 33 and 34, one clamp jaw 33 being mounted on pivot pin 25 and the other clamp jaw 34 being pivoted near the opposite ends of the yoke arms 31 and 32, adjacent the shank or bridge 35 of the yoke, on pin 25a. The shank end of the yoke is adapted to swing on the pintle pin 25 in respect to the housing and a rod 36 of the spring actuated assembly projects through the housing between the clamp jaws, each of which is recessed at 37 to conform to the configuration of the rod. The bottom end of the yoke, preferably in the form of a reduced projecting lug 38, is restricted in its swinging movement toward and away from an adjustable stop 39 mounted in one side wall of the housing. This stop 39 is in the form of a pin, screw threaded at 40, to mate with screw threads formed in the wall of a recess extending through the side wall of the housing. A clamp nut 41 is screwed to the pin for clamping it in adjusted position in respect to the carrier yoke. A coil compression spring 42 is interposed between the side wall, housing the stop pin, and the projecting lug 38 on the yoke carrier, said lug having an embossment 43 for holding the end of the carrier spring in alignment with its opposite end which surrounds the pin. The pin is so adjusted that when the bottom end of the yoke is swung for the embossment 43 thereon to be in contact with the end of stop pin 39, the yoke is perpendicular in respect to the longitudinal axis of the rod 36. The spring 42 is compressed, when the yoke is perpendicular, to normally urge the yoke away from and out of contact with the stop pin 39. Opposite to the stop pin and slidably mounted in the opposite wall of the housing is a release pin 44 having a section 44a screw-threadedly attached to a socket therein to be locked in adjusted position by a stop nut 45. This release pin is slidably mounted in a recess 46 through the side wall of the housing between the projection 38 on the bottom end of the yoke carrier and the end 47 of a handle 48 pivoted at 49 to portion 50 on the housing through which the pivot passes. A stop 51 is formed on the handle 48 in position to abut against the portion 52 of the housing so that the end of the handle 48 will be maintained in longitudinal alignment with the release pin for confining it in position. The opposite end of the handle is provided with a perforation 53 for receiving one end of spring 54, its opposite end being attached to a lug 55 on the housing for normally holding the stops 51 and 52 in contact. A series of perforations 56 are also formed in the handle 48 to receive the end of a remote control rod or cable (not shown). The housing has another duplicate portion 50a with a recess 49a also provided to receive the pivot 49 for pivoting the handle 48 thereto with its end extending in the opposite direction, if desired, so that the handle can be mounted selectively to either portion 50 for left-handed or right-handed operation. There is also a duplicate stop portion 52a on the housing. The top of the housing is closed by a cap 57 bolted thereto by screws or bolts 58, and there is a similar bottom cap 59 secured to the housing by screws 60, said bottom cap being recessed at 61 to allow for drainage of any liquid that may be collected within the housing. These caps are reversible so that should the housing be in inverted position, the bottom cover will be the one having the recess 61 therein.

One end of the rod 36 projects into the end of the spring cylinder to be attached to a plunger 62 slidably mounted within said cylinder adjacent the end of a main spring 63 housed therein, said plunger being clamped against shoulder 64, formed on the rod, by nut 65 bearing against an interposed washer 66. The opposite end of this rod 36 is adjustably attached to a sleeve 67 pivoted to a sectional clamp 68 bolted at 69 to the loading arm, said end of the rod being screw threaded at 70 to receive clamp nuts 71 disposed on opposite sides of the sleeve 67. Thus, the opposite ends of the spring cylinder are pivotally connected to the loading arm of the assembly for permitting it to move upwardly and downwardly in a vertical plane with the loading arm.

It will be readily apparent from the foregoing description that the spring actuated loading assembly can be moved in a horizontal plane to bring the free discharge end of the loading arm in vertical alignment with the filling opening in the transport tank to be filled and then lowered and raised. In lowering the loading arm to filling position, the plunger compresses the main spring in the cylinder, and the connecting rod freely passes between the clamp jaws as they are urged toward perpendicular position against the force of the carrier spring by the rod moving in a direction away from clamping position. The carrier spring is compressed as is the main spring in the cylinder as the loading arm moves downwardly and the rod moves into the cylinder against the main spring. Upon stopping the downward movement of the loading arm, the main spring forces the rod to move upwardly out of the cylinder in the opposite direction, and the carrier spring swings the bottom free end of the yoke to non-perpendicular position (Fig. 6) so that said rod will be clamped between the said clamp jaws. The greater the force that is exerted to move the rod out of the cylinder, the greater will be the frictional grip of the clamp jaws upon the rod, and such gripping action is applied entirely automatically immediately upon the stopping of the downward movement of the loading arm. However, the clamp jaws can be readily actuated to perpendicular position to release the rod by means of the handle which is associated with the slidable release pin.

I am aware that there may be various changes in details of construction without departing from the spirit of my invention, and, therefore, I claim my invention broadly as indicated by the appended claims.

Having thus described my invention, what I claim as new and useful and desire to secure by United States Letters Patent, is:

1. A spring actuated loading assembly comprising a vertically swingable liquid loading conduit arm, a rod operatively connected to said arm and to a return spring, holding means associated with said arm and operatively connected with an housed portion of the rod to urge said holding means to non-holding position when said arm is swung downwardly, and means for operating the holding means to engage said arm upon its return movement upwardly, said holding means comprising a pair of clamp jaws, one of which jaws is pivoted to a yoke carrier for the clamp jaws, and said yoke is mounted in a housing by a pintle common to the other clamp jaw, thereby permitting the yoke and one of the clamp jaws to swing relatively to the other clamp jaw.

2. The spring actuated loading assembly of claim 1 in which the housing is provided with stop means for limiting the swinging movement of the yoke carrier from a position perpendicular to the longitudinal axis of the rod to a non-perpendicular position.

3. The spring actuated loading assembly of claim 2 in which the yoke carrier is provided with means for holding the yoke carrier perpendicular to the longitudinal axis of the rod when the loading arm is lowered and resilient means for moving the yoke to non-perpendicular position when movement of the loading arm is reversed.

4. The spring actuated loading assembly of claim 3 having a manually operable means mounted on the housing for moving the yoke to perpendicular position.

5. The spring actuated loading assembly of claim 4 in which the manually operable means is adapted to be mounted in different selected positions on the housing.

6. The spring actuated loading assembly of claim 4 in which the manually operable means comprises a slidable means on the side of the yoke carrier opposite to the means for holding the yoke carrier perpendicular to the longitudinal axis of the rod.

7. The spring actuated loading assembly of claim 6 in which the manually operable means is a handle provided with a spring for holding said handle in retracted position.

8. The spring actuated loading assembly of claim 6 in which the housing member has removable top and bottom closure plates for giving access to the yoke carrier mounted within said housing.

9. A spring actuated loading assembly comprising a vertically swingable loading arm, a spring cylinder pivoted at one end to a fixed portion of said assembly, a spring within said cylinder associated with a rod extending therefrom to be attached to the loading arm, a housing fitted to that end of the cylinder from which the rod extends, a yoke having forked ends pivoted to the housing, a clamp jaw also pivoted to said housing, a mating clamp jaw pivoted to the yoke remote from its pivot end, certain mating jaws being disposed adjacent opposite sides of the rod, stop means for limiting the yoke in one extreme swinging position to be perpendicular to the longitudinal axis of the rod, resilient means interposed between the yoke and stop means to normally urge said yoke to non-perpendicular position for clamping the jaws against the rod, and means for moving the yoke to perpendicular position, to release the rod from the clamp jaws.

10. The spring actuated loading assembly unit of claim 9 in which the means for moving the yoke to perpendicular position is adapted to be mounted on the housing in different selected positions.

11. A holding device for reciprocating rods comprising a housing through which said rod projects, a clamp jaw and carrier therefor pivoted to the housing, said clamp jaw being disposed adjacent one side of the rod, a mating clamp jaw pivoted to the carrier and disposed adjacent the opposite side of said rod, stop means limiting the pivoted movement of the carrier in one direction from an opposite direction to be perpendicular to the longitudinal axis of said rod, and resilient means for normally urging the carrier to non-perpendicular position.

12. The holding device of claim 11 in which means is provided for moving the carrier to perpendicular position.

13. The holding device of claim 12 in which the carrier moving means is mounted on the housing.

14. The holding device of claim 13 in which the carrier moving means comprises a release member mounted on the housing opposed to the stop means, and there is a handle for operating said release member.

15. The holding device of claim 13 in which there is a release member adapted to be mounted upon the housing and a handle for operating said release member in selected positions.

16. The holding device of claim 14 in which the carrier is a forked member having the forked ends pivoted to the housing and having the other clamp jaw pivoted to the carrier remote from the pivoted end of the forked ends.

17. The holding device of claim 15 in which the end of the carrier opposite the forked ends is interposed between the stop means and the release means.

References Cited in the file of this patent

UNITED STATES PATENTS

| Number | Name | Date |
|---|---|---|
| 346,784 | Stanford | Aug. 3, 1886 |
| 473,283 | Adams | Apr. 19, 1892 |
| 655,233 | Heuck | Aug. 7, 1900 |
| 1,114,832 | Whitney | Oct. 27, 1914 |
| 1,422,125 | Pherson | July 11, 1922 |
| 1,790,705 | Heywood | Feb. 3, 1931 |
| 1,853,517 | Finnerty | Apr. 12, 1932 |
| 2,250,227 | Kiel | July 22, 1941 |
| 2,492,049 | Krone | Dec. 20, 1949 |
| 2,509,120 | Warren | May 23, 1950 |